United States Patent
Bourdoulous

(10) Patent No.: US 8,894,335 B2
(45) Date of Patent: Nov. 25, 2014

(54) SLIDER LOCKNUT

(71) Applicant: Robert P. Bourdoulous, Shelton, CT (US)

(72) Inventor: Robert P. Bourdoulous, Shelton, CT (US)

(73) Assignee: United Technologies Corporation, Hartford, CT (US)

( * ) Notice: Subject to any disclaimer, the term of this patent is extended or adjusted under 35 U.S.C. 154(b) by 96 days.

(21) Appl. No.: 13/705,881

(22) Filed: Dec. 5, 2012

(65) Prior Publication Data
US 2014/0154026 A1    Jun. 5, 2014

(51) Int. Cl.
*F16B 39/10*    (2006.01)
(52) U.S. Cl.
USPC .......................................... 411/198; 411/197
(58) Field of Classification Search
USPC ......... 411/121, 195–197, 200, 206, 533, 540, 411/544, 943, 982, 198, 199
IPC ............................................ F16B 39/10,39/08
See application file for complete search history.

(56) References Cited

U.S. PATENT DOCUMENTS

| | | | | |
|---|---|---|---|---|
| 975,145 A | | 11/1910 | Maher | |
| 977,507 A | * | 12/1910 | Brown | 411/197 |
| 1,077,763 A | * | 11/1913 | Stark | 411/254 |
| 1,198,271 A | * | 9/1916 | Price | 411/193 |
| 1,201,501 A | * | 10/1916 | Rice | 411/201 |
| 1,224,556 A | * | 5/1917 | McConahy | 411/201 |
| 1,247,236 A | * | 11/1917 | Dobbins | 411/120 |
| 1,270,734 A | * | 6/1918 | Hennings | 411/197 |
| 1,334,887 A | * | 3/1920 | Carson | 411/191 |
| 1,448,178 A | * | 3/1923 | Andrix | 411/198 |
| 1,465,221 A | * | 8/1923 | Joy | 411/201 |

OTHER PUBLICATIONS

Google, Tooth Washer, Grainger, p. 1, Dec. 5, 2012.

* cited by examiner

*Primary Examiner* — Gary Estremsky
(74) *Attorney, Agent, or Firm* — M. P. Williams; Malcolm J. Chisholm, Jr.

(57) ABSTRACT

A locknut (12) has an L-shaped slider (18) formed of a washer-like piece (19) held above a nut (13) by a contiguous spring element (20) spot-welded to the nut. The spring causes the washer to press against a bolt (33) or stud with locking torque when the locknut is secured thereon, and to rest away from the nut when not adjacent a bolt or stud. While the locknut is being tightened or loosened, a wrench (29) forces the spring against the nut so the washer surrounds a bolt or stud without contacting it. A skirt (43), of straight or downwardly-curved cantilevers (46, 46*a*) may be disposed on an annulus secured to a surface of the nut opposite the washer, for additional locking torque.

4 Claims, 3 Drawing Sheets

SLIDER LOCKNUT

TECHNICAL FIELD

A locknut has a spring loaded, sliding ring near the top of the nut which presses against the bolt threads after being tightened with a socket wrench. The locknut also has a skirt attached to its bottom surface which may comprise straight or curved levers.

BACKGROUND

A common variety of locknuts are those which use a deformed (ovalized) nut which requires significant torque to thread the nut onto a bolt or stud. Deformed nuts wear the stud threads which can limit their useful life.

Another common variety of locknuts are those which use partial or full elastomer inserts which require significant torque to thread the nut onto a bolt or stud. However, use of elastomer inserts are very limited in high temperature applications and they mask faults in the bolt or stud being secured.

Some locking features are effective only as long as the stud threads are not worn. Once the stud threads are worn, the deformed locknut will lose some of its resistance torque.

Some locking features are effective only so long as the nut does not turn with respect to the bolt or stud. Once the nut turns some minimal amount, either due to temperature variations, shock or vibration, the nut will no longer be locked.

When a nut is tightened on the threads of a bolt or stud, the more torque applied, the more live load or preload that is passed through the threads of the bolt to create a tensile force in the bolt. To avoid disruption of the locking feature as a result of minimal rotation, many locknuts rely on a torque provided by a resilient preload, such as Belleville washers and the like.

During repair or overhaul procedures, the locknuts need be loosened, and thereafter reapplied to the same or similar bolts. In either case, the threads of either the locknut or the bolt may be worn as a consequence of the tensile stress applying frictional forces to the threads of the bolt and of the locknut. This wear can increase the likelihood of the locknut loosening by virtue of vibration, or in some instances, by virtue of rotary shock imparting torque to the locknut inadvertently. In some cases, nuts are secured to bolts after being fully tightened thereon by pinching, by deformation of the bolt and nut, or by damaging small areas of the interface between the bolt threads and with the nut threads, such as by denting with a punch or chisel. In the latter cases, the upper portion of the bolt receives as much wear as the nut whenever repair or other refurbishment occurs. Utilizing new locknuts does not necessarily overcome the likelihood of locknuts loosening thereafter. In cases where the bolt is in fact a stud, stud replenishment would be required in order to be fully effective.

SUMMARY

A locknut comprises a nut having a first, upper surface and a second, lower surface opposite to the first surface with at least one flat side extending therebetween. A generally L-shaped, spring slider assembly includes, a) as its base, a slightly curved spring element with a lower end thereof secured to the nut on a flat side adjacent the second surface, the spring element having a rest position with the crotch of the L away from the side, and b) a washer-like piece extending from the crotch of the L over the first surface. The L-shaped spring slider assembly is configured to fit within a wrench contacting both the nut and the spring element. When the nut is tightened or loosened on a bolt or stud, the spring element is urged toward the flat side by the wrench so the washer-like piece extends around the bolt or stud without contacting it. The L-shaped spring slider assembly urges the washer-like piece against the teeth of a bolt or stud on which the nut has been tightened, upon removal of the wrench. A skirt fastened to the lower surface has straight or downwardly-curved cantilevers which grip the surface of a piece against which the nut is tightened.

Other variations will become more apparent in the light of the following detailed description of exemplary embodiments, as illustrated in the accompanying drawings.

MODE(S) OF IMPLEMENTATION

Figure 1:
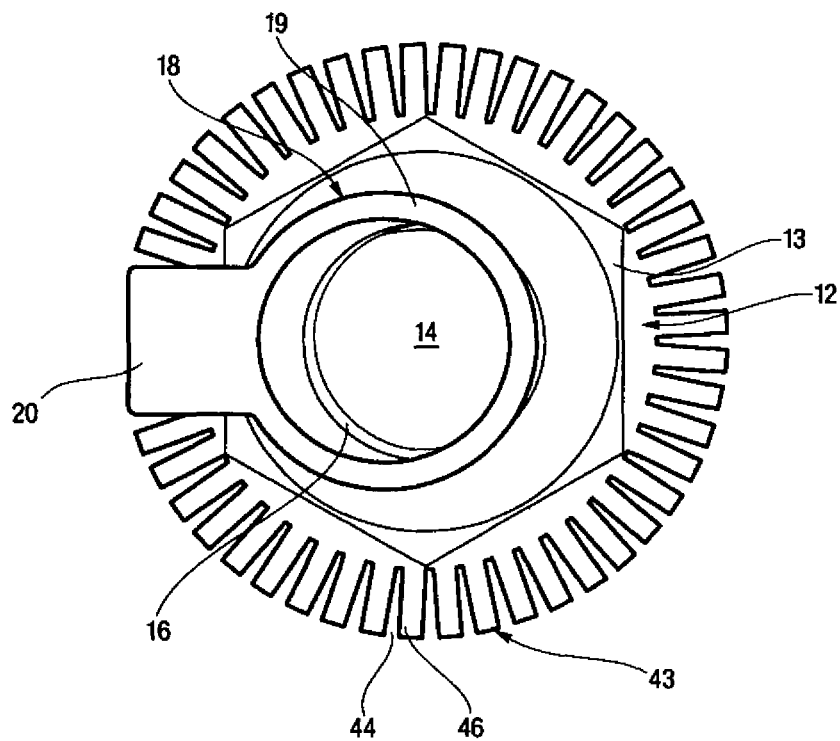
FIG. 1 is a top plan view of a locknut in accordance herewith.
Figure 2:
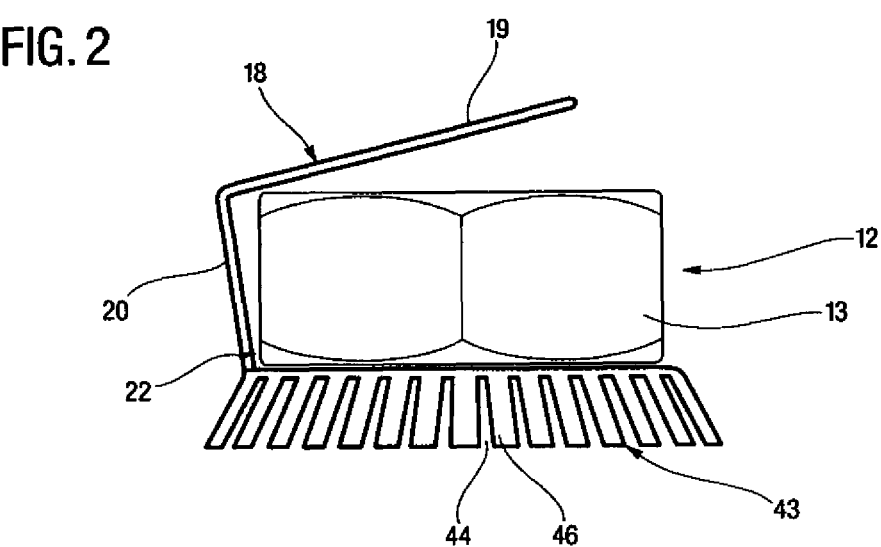
FIG. 2 is a side elevation view of the locknut of FIG. 1.

Referring to FIGS. 1 and 2, a locknut 12 includes a nut 13 having a bore 14 with threads 16. A generally L-shaped, thin, spring slider assembly 18 having a washer-like portion 19 in which the base of the L is a spring element 20, that is bent away from the nut at a small angle, and which is attached to the nut 13 such as by spot welding 22, or the like. When at rest as shown in FIG. 2, the washer-like portion 19 is away from the nut a sufficient distance to allow threading the entire nut fully onto a bolt or a stud with minimal torque, without the slider engaging the threads thereof.

Figure 4:
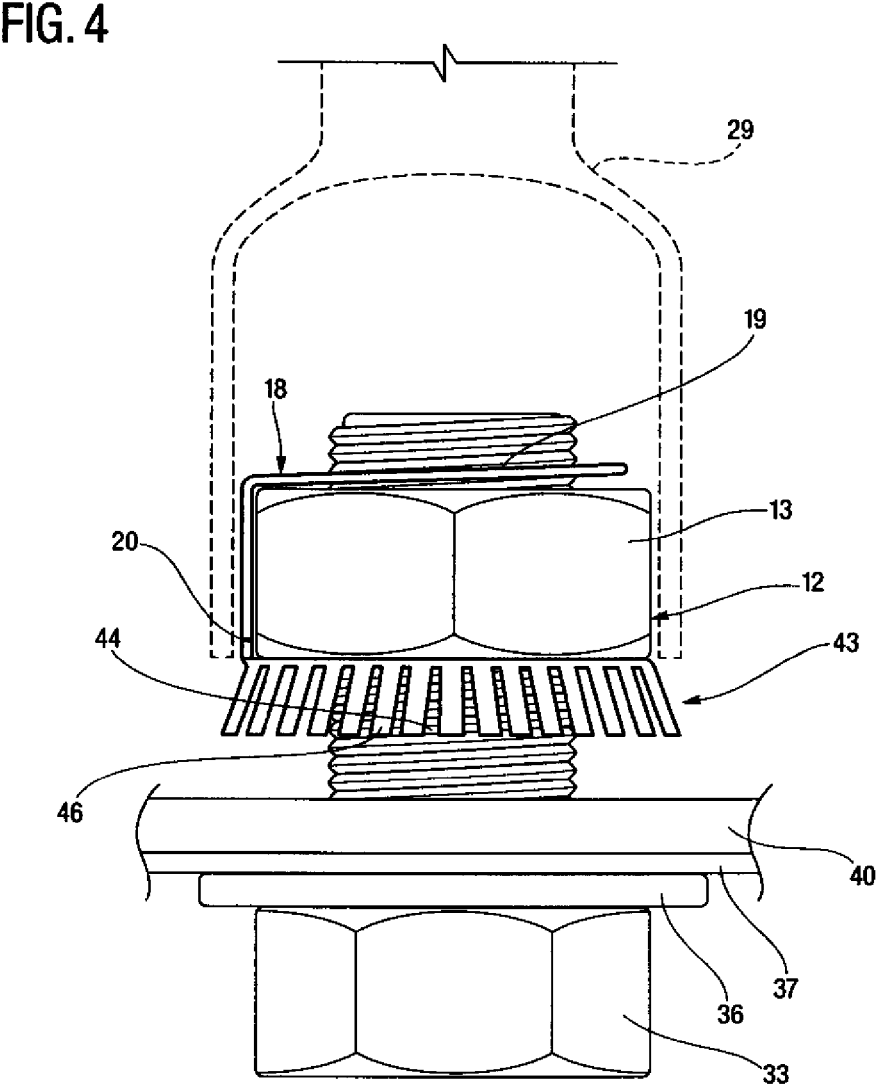
FIG. 4 is a side elevation view of the locknut of FIG. 1 as it is being tightened on a bolt so as to secure a workpiece to a structure.

FIG. 4 illustrates the lock nut 12 as it is being tightened by a socket 29 shown in phantom. The slider 18 has been moved to the right in the figure by the socket 29 forcing the spring 20 against the nut 13. The entire washer-like portion 19 is clear of the threads 31 of a bolt 33 which is securing a washer 36 and a work piece 37 to a structure 40. When the socket 29 is removed, as illustrated in FIG. 5, the spring portion 20, being no longer constrained, will pull the washer portion 19 toward the right so that the washer portion 19 presses against the threads, thereby locking the nut to the bolt.

The locking feature can be released when the nut is to be removed by slipping a wrench over the nut 13 and slider 18 as illustrated in FIG. 4, forcing the slider 18 to the right in the figures. Then there is no additional torque to overcome, other than the live load caused by torque previously applied to the nut.

Figure 3:
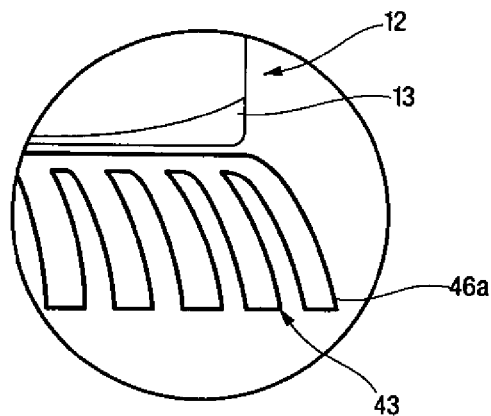
FIG. 3 is a fragmentary side elevation view of an alternative skirt for the locknut of FIGS. 1 and 2.

To apply additional locking torque to the lock nut 12, a truncated cone skirt 43 may also be secured to the bottom of the nut 13. The skirt 43 may comprise a washer-like annulus spot welded to the bottom of the nut, with pie-shaped notches 44 cut therein so as to provide cantilevers 46 which are angled downwardly as shown in FIG. 2. Any upward pressure on the tips of the cantilevers 46 will result in a downward, spring force. Thus, the skirt 43 may act in a manner similar to a Belleville washer. The cantilevers 46 may be straight as illustrated in FIGS. 1 and 2 or they may be concave downward, in the fashion of a Belleville washer, as illustrated by the curved cantilevers 46a in FIG. 3.

Figure 5:
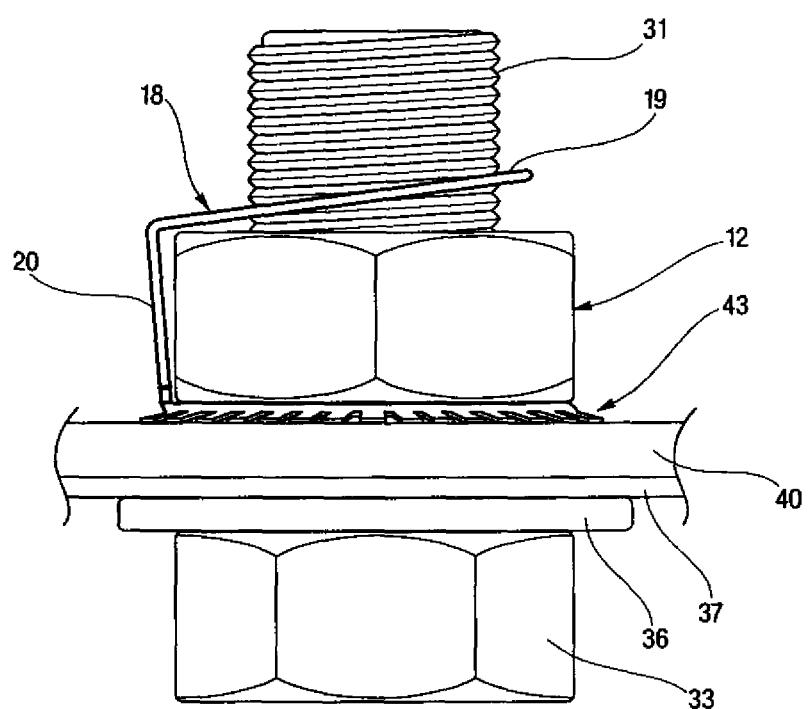
FIG. 5 is a side elevation view of the locknut of FIG. 1 after it has been tightened on a bolt so as to secure a workpiece to a structure.

The skirt 43 is shown substantially planar when the nut is tightened as in FIG. 5. The degree of flattening of the skirt 43, however, may vary and it may well not be substantially planar when the nut has had the desired amount of torque applied thereto.

Since changes and variations of the disclosed embodiments may be made without departing from the concept's intent, it is not intended to limit the disclosure other than as required by the appended claims.

The invention claimed is:

1. A locknut (12) comprising:
 a nut (13) having a first, upper surface and a second, lower surface opposite to the first surface with at least one flat side extending therebetween;
 characterized by:
 a generally L-shaped, spring slider assembly (18) including, a) as its base, a spring element (20) with a lower end thereof attached (22) to the nut on the at least one flat side adjacent the lower surface, the spring element having a rest position with the crotch of the L away from the at least one flat side, and b) a washer-like piece (19) extending from the crotch of the L over the first surface; and
 a skirt (43) fastened to the lower surface and having straight or downwardly-curved cantilevers which grip the surface of a piece against which the nut is tightened.

2. A locknut (12) according to claim 1 further characterized in that:
 the L-shaped spring slider assembly (18) is configured to fit within a wrench contacting the nut (13) and the spring element (20), the spring element being urged toward the at least one flat side by the wrench when the nut is tightened or loosened on a bolt (33) or stud.

3. A locknut (12) according to claim 2 further characterized in that:
 the washer-like piece (1) is configured to extend around the bolt (33) or stud without contacting it when the spring element (20) is urged toward the at least one flat side by the wrench.

4. A locknut (12) according to claim 2 further characterized in that:
 the L-shaped, spring slider assembly (18) is configured to urge the washer-like piece (19) against the teeth (31) of a bolt (33) or stud on which the nut has been tightened upon removal of the wrench.

* * * * *